May 25, 1926.
J. R. FUNK ET AL
1,586,360
VALVE LIFTING MACHINE
Filed March 11, 1924     2 Sheets-Sheet 1
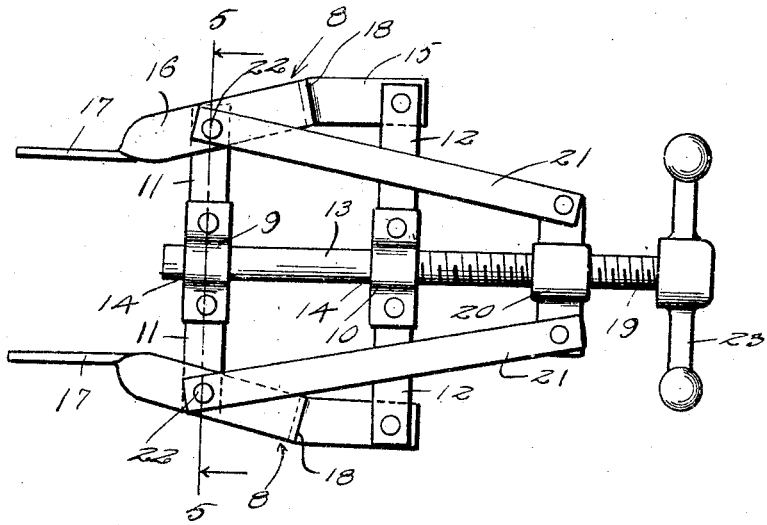
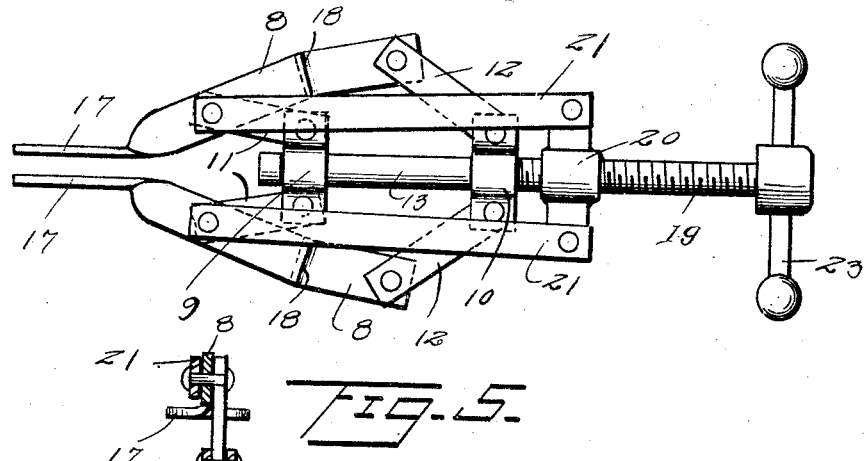
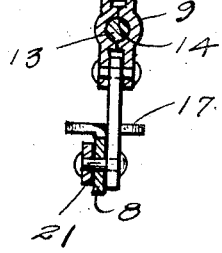
Inventor
J. R. Funk,
W. Lynch

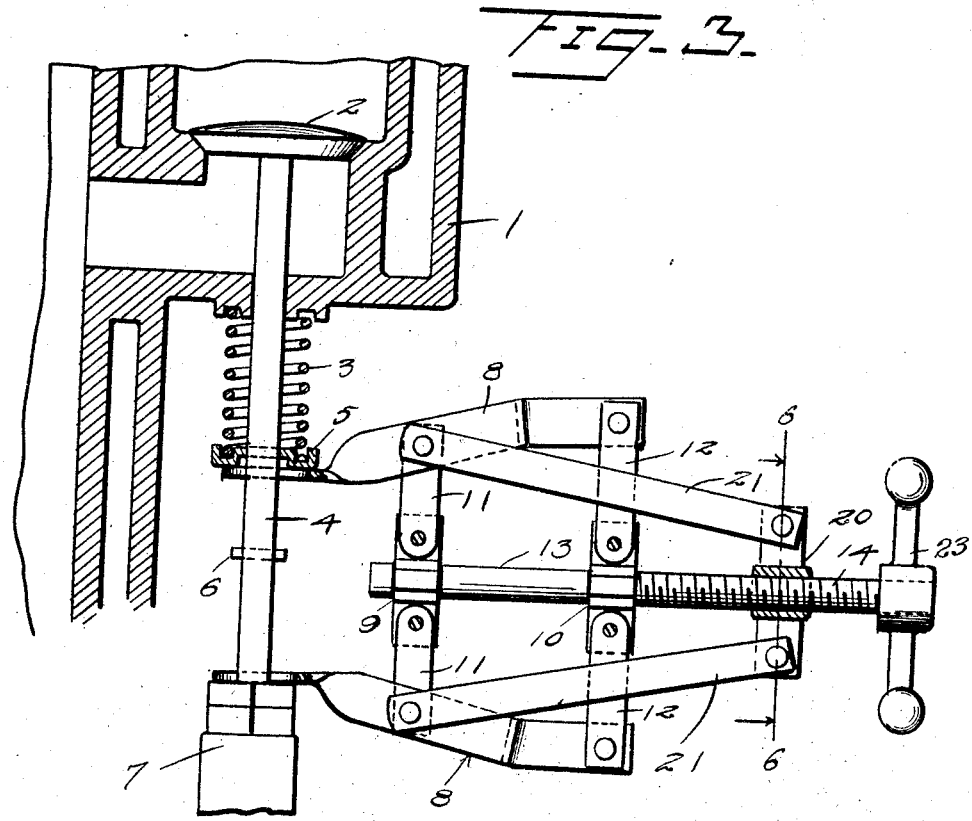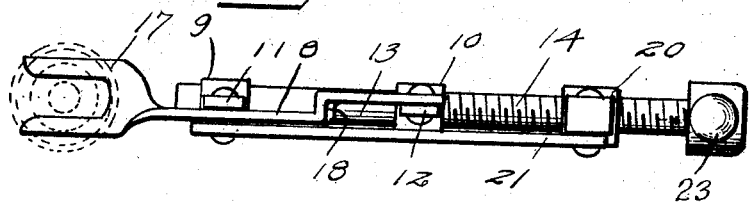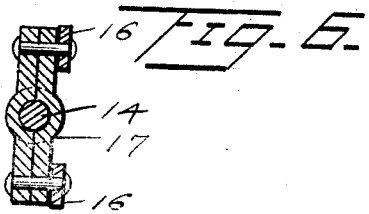

Patented May 25, 1926.

1,586,360

UNITED STATES PATENT OFFICE.

JOHN R. FUNK AND WESLEY LYNCH, OF DUNCAN, OKLAHOMA.

VALVE-LIFTING MACHINE.

Application filed March 11, 1924. Serial No. 698,388.

This invention relates to improvements in valve tools, and has for its primary object the provision of a tool through the medium of which the washer forming a seat for the lower end of the spring of a tappet valve for internal combustion engines may be readily raised out of engagement with its supporting pin when it is desired to remove the latter, which shall embody a construction adapted to prevent its tilting during use and adapted to prevent the tilting and binding of the washer against the valve stem while the washer is being raised, and which shall be simple and durable.

With the above and other objects in view, the invention consists in the construction, combination and arrangement of parts hereinafter fully described and claimed, and illustrated in the accompanying drawings, wherein:

Figure 1 is a view in side elevation of a valve tool constructed in accordance with my invention, the jaws of the tool being shown in opened position, Figure 2 is a similar view of the tool with the jaws in closed position, Figure 3 is a view illustrating the manner in which the tool is adapted to support the washer of a tappet valve in raised position to permit the withdrawal of the washer supporting pin, Figure 4 is a view in edge elevation of the tool, Figure 5 is a sectional view taken on the plane indicated by the line 5—5 of Figure 1, and Figure 6 is a sectional view taken on the plane indicated by the line 6—6 of Figure 3.

Referring to the drawings by reference numerals, 1 designates a fragmentary portion of an internal combustion of the type employing tappet valves. The valve 2 is yieldingly held against its seat by a spring 3 which is mounted upon the stem 4 of the valve and which rests at its lower end upon a washer 5. A pin 6 passing through the valve stem 4, maintains the washer 5 in the required position on the valve stem 4 which rests at its lower end upon a tappet 7, the upper end only of which is shown.

The tool forming the subject matter of this application is especially adapted to permit the washer 5 to be readily raised out of contact with the pin 6 when it is desired to withdraw the latter, which must be done before the valve and the other parts associated therewith may be removed. The tool comprises a pair of arms 8 which are connected to yokes 9 and 10 by links 11 and 12, respectively. A shaft 13 is rotatably mounted in the yokes 9 and 10 which are of sectional formation and which occupy annular grooves 14 in the shaft. The connection between the yokes 9 and 10 and the shaft 13, is such that the shaft, while free to rotate with respect to the yokes, is held against any endwise movement relative to the yokes and the yokes are held against any relative movement in the direction of the length of the shaft. The arms 8 have substantially parallel inner portions 15, inwardly extending intermediate portions 16, and forwardly extending outer portions 17. The outer portions 17 are arranged in parallel relation, and they are enlarged and slotted to provide forked jaws. The arms 8 are offset as shown at 18 to position the portions 15 and 16 thereof in spaced parallel planes. The outer ends of the links are pivoted to the arm portions 16 at one side of the arms, and the outer ends of the links 12 are pivoted to the arm portions 15 at the opposite side of the arms. The shaft 13 is screw threaded as shown at 19 to receive a traveling yoke 20. This yoke has pivoted thereto arms 21 which are also pivoted to the arm portions 16 by the elements 22 which connect the links to these portions of the arms 8. To permit the shaft 13 to be readily turned, the outer end thereof is provided with a handle 23.

The parts of the tool are so relatively arranged and connected that the jaw 17 will close when the shaft 13 is turned in one direction and open when the shaft is turned in the opposite direction, and the formations and relative arrangement of the parts are such that the parallel arrangement of the jaws will not be altered during the opening and closing movements thereof.

When it is desired to raise the washer 5 out of contact with the pin 6 so as to permit the withdrawal of the latter, the jaws are first closed and then applied to the valve stem between the washer 5 and the upper end of the tappet 7. The shaft 13 is then turned to open or spread the jaws 17, with the result that the washer will be moved upwardly upon the pin 6 against the tension of the spring 3, as shown in Figure 3. When the washer 5 is in this position, the pin 6 may be readily withdrawn by means of a hammer or pliers. As the jaws are always in parallel position with respect to each other, the washer 5 will not, during its upward movement on the valve stem 4, tilt and bind against the valve stem, and the tool will not tilt or slip during the use thereof.

It should be understood that the drawings are merely illustrative, and no not pretend to give exact proportions. Furthermore, the said drawings are illustrative of a preferred construction, it being our expectation that various changes and modifications may be made without departing from the spirit and scope of our invention.

What is claimed is:—

1. A valve tool of the character set forth, comprising yokes, a pair of arms having inner portions, inwardly inclined intermediate portions and parallel outer portions, the latter being slotted to provide forked jaws, links pivoted to the inner portions of the arms and to one of the yokes, links pivoted to the intermediate portions of the arms and to other yokes, a shaft provided with an threaded portion, means rotatably connecting the shaft to the yokes and holding the latter against longitudinal movement on the former, a traveling yoke mounted on the threaded portion of the shaft, and bars pivoted to the traveling yoke and to the intermediate portions of the arms.

2. A valve tool of the character set forth, comprising yokes, a pair of arms provided with inner portions, inwardly inclined intermediate portions and parallel outer portions, the outer portions being slotted to provide forked jaws and the intermediate and inner portions being relatively offset, links pivoted to the inner portions of the arms at one side of the latter and to the one of the yokes, links pivoted to the intermediate portions of the arms at the opposite sides of the latter and to the other yoke, a shaft provided with a threaded portion, means rotatably connecting the shaft to the yokes and holding the latter against longitudinal movement on the former, a traveling yoke mounted on the threaded portion of the shaft, and bars pivoted to the traveling yoke and to the intermediate portions of the arms.

3. A valve tool of the character set forth, comprising yokes, a pair of arms having inner portions, inwardly and outwardly inclined intermediate portions and parallel outer portions, said inner and inclined portions of each arm being offset, links pivoted to one of the yokes, pivots connecting the links to the inclined portions of the arms, links pivoted to the inner portions of the arms and to the other of said yokes, a shaft provided with a threaded portion, means rotatably connecting the shaft to the yokes and holding the latter against longitudinal movement on the former, a traveling yoke mounted on the threaded portion of the shaft, and bars pivoted to the traveling yoke and to said pivots.

In testimony whereof we affix our signatures.

JOHN R. FUNK.
WESLEY LYNCH.